US008996702B2

(12) United States Patent
Blank et al.

(10) Patent No.: US 8,996,702 B2
(45) Date of Patent: Mar. 31, 2015

(54) METHOD, SYSTEM, AND COMPUTER PROGRAM PRODUCT FOR ROUTING SESSIONS TO A SPECIFIC URL IN A MULTI-SITE ENVIRONMENT

(75) Inventors: Michael H. Blank, Atlanta, GA (US); John M. Higdon, Lexington, KY (US); Debra A. Kipping, North Richland Hills, TX (US); Tina M. Lemire, Lexington, KY (US); Amy W. Toombs, Acworth, GA (US)

(73) Assignee: International Business Machines Corporation, Armonk, NY (US)

( * ) Notice: Subject to any disclaimer, the term of this patent is extended or adjusted under 35 U.S.C. 154(b) by 2060 days.

(21) Appl. No.: 11/230,097

(22) Filed: Sep. 19, 2005

(65) Prior Publication Data

US 2007/0067489 A1 Mar. 22, 2007

(51) Int. Cl.
*G06F 15/16* (2006.01)
*H04L 29/12* (2006.01)
*H04L 29/08* (2006.01)

(52) U.S. Cl.
CPC ........ *H04L 29/12594* (2013.01); *H04L 61/301* (2013.01); *H04L 67/2814* (2013.01); *H04L 67/1002* (2013.01); *H04L 67/1014* (2013.01)
USPC .......... 709/227; 709/223; 709/225; 709/226; 709/228; 709/229; 709/238

(58) Field of Classification Search
CPC .......... G06F 17/30887; G06F 11/3433; G06F 9/5083; H04L 2012/568; H04L 2012/5678; H04L 29/08144; H04L 29/06; H04L 29/08072; H04N 21/23103
See application file for complete search history.

(56) References Cited

U.S. PATENT DOCUMENTS

| | | | | |
|---|---|---|---|---|
| 6,078,943 A * | 6/2000 | Yu | ................................. | 718/105 |
| 6,789,103 B1 * | 9/2004 | Kim et al. | ...................... | 709/203 |
| 2001/0039581 A1 * | 11/2001 | Deng et al. | ..................... | 709/226 |
| 2002/0143964 A1 * | 10/2002 | Guo | .............................. | 709/229 |
| 2002/0188862 A1 * | 12/2002 | Trethewey et al. | ........... | 713/201 |
| 2003/0154283 A1 * | 8/2003 | Brown | .......................... | 709/226 |
| 2003/0158940 A1 * | 8/2003 | Leigh | ............................ | 709/226 |

* cited by examiner

*Primary Examiner* — Jude Jean Gilles
*Assistant Examiner* — Jaren M Means
(74) *Attorney, Agent, or Firm* — Matthew Chung; Hoffman Warnick LLC

(57) ABSTRACT

The present invention provides a method, system, and computer program product for routing sessions to a specific Uniform Resource Locator (URL) in a multi-site environment. An ordered list of servers is provided in a multi-site environment. Upon receipt of a session request submitted by a user, the ordered list of servers is looped through until a valid URL is found. When a valid URL is found, the session request is redirected to the server in the multi-site environment specified by the valid URL.

20 Claims, 4 Drawing Sheets s
METHOD, SYSTEM, AND COMPUTER PROGRAM PRODUCT FOR ROUTING SESSIONS TO A SPECIFIC URL IN A MULTI-SITE ENVIRONMENT

FIELD OF THE INVENTION

The present invention generally relates to computing systems, and more specifically relates to a method, system, and computer program product for routing sessions to a specific Uniform Resource Locator (URL) in a multi-site environment.

BACKGROUND OF THE INVENTION

In a multi-site "high availability" environment, routing a request to a particular site within the multi-site environment can be problematic. There are many factors that need to be designed into a solution. The solution must address balancing requests between sites, and must be able to fail over to a working site if a site is unavailable. The solution must also have the flexibility to allow a developer to generate robust and dynamic URL strings. There are no known solutions to this problem.

An illustrative high availability multi-site environment 10 is depicted in FIG. 1. The multi-site environment 10 includes a plurality of substantially identical, independent sites 12A, 12B, . . . , 12N, each including a plurality of servers 14.

At any given time, a browser session 16 may be directed to a server 14 on any of the sites 12A, 12B, . . . , 12N in the multi-site environment 10 available at that time. For example, on a first day a user's browser session 16 may be directed to a server 14 at site 12A, while on the next day the user's browser session 16 may be directed to a server 14 at site 12B. This is done without the knowledge of the user. This can create a problem when, for example, two or more users at different sites 12A, 12B, . . . , 12N wish to collaborate using a application (e.g., a chat application) that is unaware of the existence of other sites 12A, 12B, . . . , 12N in the multi-site environment 10. One problem to be solved, therefore, is how to route a plurality of independent browser sessions 16 to the same server 14 at the same site 12A, 12B, . . . , 12N in the multi-site environment 10.

SUMMARY OF THE INVENTION

In general, the present invention provides a method, system, and computer program product for routing sessions to a specific Uniform Resource Locator (URL) in a multi-site environment.

The present invention provides a set of URL helper classes that generate a URL based on an array of ordered servers and associated information including the protocol, port, and path. Using the list of possible servers, a valid URL is determined by looping through the list until a successful connection can be found. Once a valid connection has been found, variables and their values are appended to the URL string. The URL helper classes allow a developer to define both global and runtime variables. The URL can be pushed to one or more users to route a browser session to a particular server at a particular site in a multi-site environment.

A first aspect of the present invention is directed to a method for routing sessions to a specific URL in a multi-site environment, comprising: providing an ordered list of servers in the multi-site environment; receiving a session request submitted by a user; looping through the ordered list of servers until a valid URL is found; and redirecting the session request to the server in the multi-site environment specified by the valid URL.

A second aspect of the present invention is directed to a system for routing sessions to a specific URL in a multi-site environment, comprising: a system for providing an ordered list of servers in the multi-site environment; a system for receiving a session request submitted by a user; a system for looping through the ordered list of servers until a valid URL is found; and a system for redirecting the session request to the server in the multi-site environment specified by the valid URL.

A third aspect of the present invention is directed to a program product stored on a computer readable medium for routing sessions to a specific URL in a multi-site environment, the computer readable medium comprising program code for performing the following steps: providing an ordered list of servers in the multi-site environment; receiving a session request submitted by a user; looping through the ordered list of servers until a valid URL is found; and redirecting the session request to the server in the multi-site environment specified by the valid URL.

A fourth aspect of the present invention is directed to a method for deploying an application for routing sessions to a specific URL in a multi-site environment, comprising: providing a computer infrastructure being operable to: provide an ordered list of servers in the multi-site environment; receive a session request submitted by a user; loop through the ordered list of servers until a valid URL is found; and redirect the session request to the server in the multi-site environment specified by the valid URL.

A fifth aspect of the present invention is directed to computer software for routing sessions to a specific URL in a multi-site environment, the computer software comprising instructions to cause a computer system to perform the following functions: provide an ordered list of servers in the multi-site environment; receive a session request submitted by a user; loop through the ordered list of servers until a valid URL is found; and redirect the session request to the server in the multi-site environment specified by the valid URL.

BRIEF DESCRIPTION OF THE DRAWINGS

These and other features of this invention will be more readily understood from the following detailed description of the various aspects of the invention taken in conjunction with the accompanying drawings in which.

The drawings are merely schematic representations, not intended to portray specific parameters of the invention. The drawings are intended to depict only typical embodiments of the invention, and therefore should not be considered as limiting the scope of the invention. In the drawings, like numbering represents like elements.

BEST MODE FOR CARRYING OUT THE INVENTION

The present invention provides a method, system, and computer program product for routing sessions to a specific Uniform Resource Locator (URL) in a multi-site environment.

Figure 1:
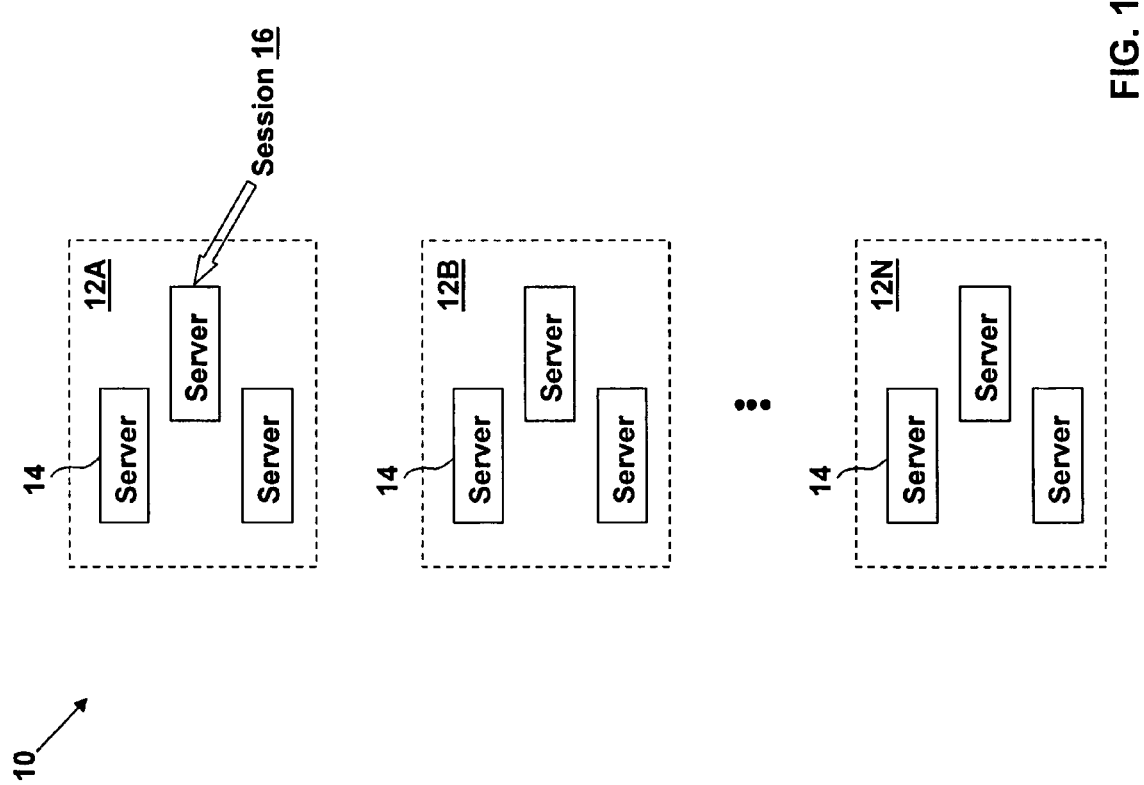
FIG. 1 depicts an illustrative high availability multi-site environment.
Figure 2:
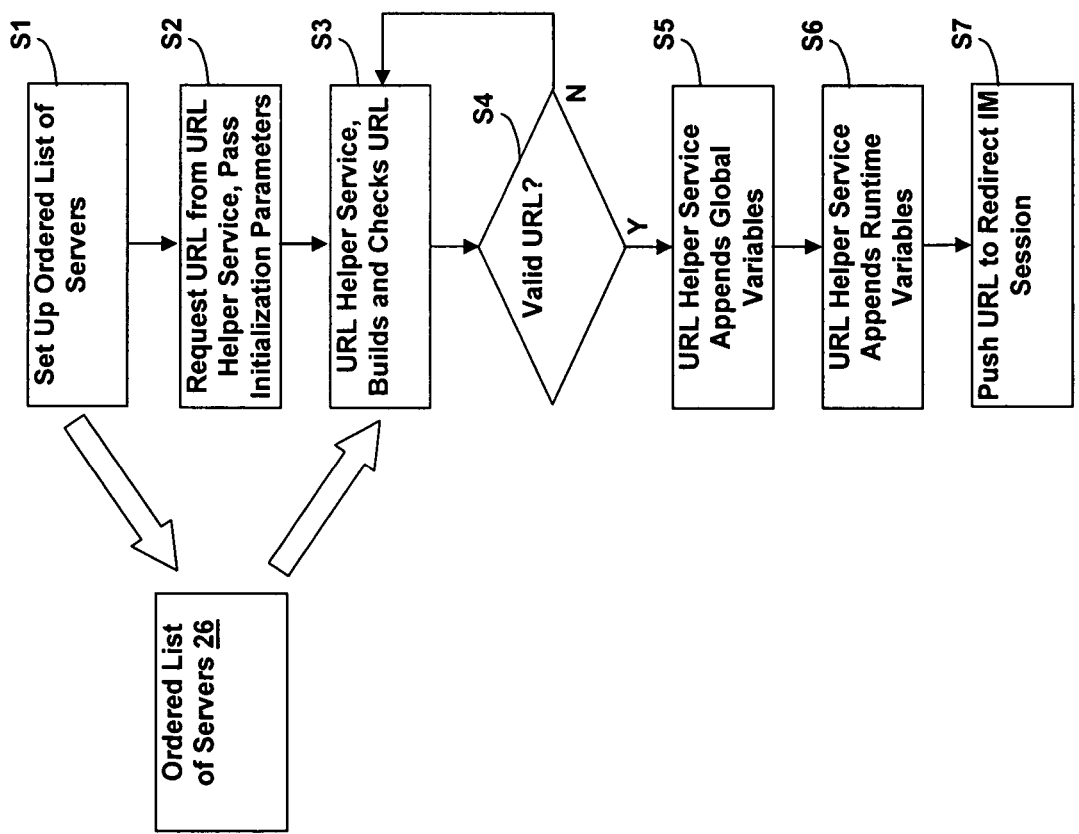
FIG. 2 depicts a flow diagram of a method for routing sessions to a specific URL in a multi-site environment in accordance with an embodiment of the present invention.
Figure 3:
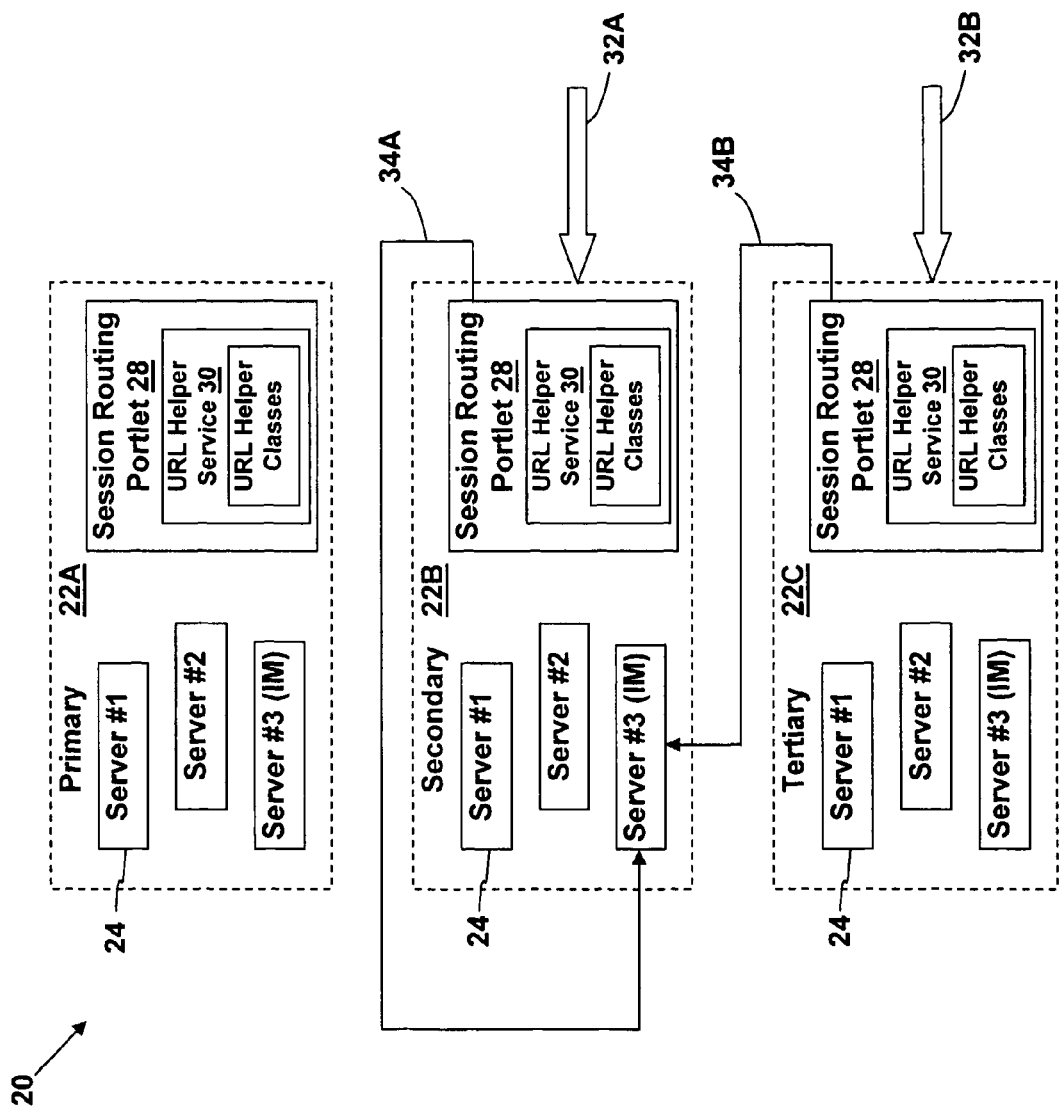
FIG. 3 depicts an illustrative high availability multi-site environment in accordance with an embodiment of the present invention.

A flow diagram of a method for routing sessions to a specific URL in a multi-site environment in accordance with an embodiment of the present invention is depicted in FIG. 2. The flow diagram will be described with reference to the illustrative multi-site environment 20 depicted in FIG. 3. The multi-site environment 20 includes a plurality (three in this example) of substantially identical, independent sites 22A, 22B, 22C, each including a plurality of servers 24.

In step S1, an ordered list 26 of servers 24 in the multi-site environment 20 is generated. First, each site 22A, 22B, 22C is prioritized. For example, site 22A can be set as the "primary" site, site 22B can be set as the "secondary" site, and site 22C can be set as the "tertiary" site. The sites can be prioritized based on predetermined criteria or in a random manner. For example, IM sessions can be grouped by topic to parallel SME (Subject Matter Experts) groups: Windows, Linux, AIX, etc. The priority of each group can be set based on the physical location of the central SME group to the hosting site. For instance, assume that the central location for a Windows SME group is Austin, Tex. and that hosting sites are located in Boulder, Colo., Research Triangle Park (RTP), N.C., and St. Louis, Mo. Since St. Louis is physically closest to Austin, it can be set as the "primary" site. Similarly, since Boulder is the next closest site and RTP is the farthest away, Boulder can be set as the "secondary" site and RTP can be set as the "tertiary" site. This prioritization scheme is based on the assumption that Austin would get better performance, even though it may be small, if their IM communications were routed to the site closest to them.

The servers 24 within each prioritized site 22A, 22B, 22C are each assigned a different task. For example, one server 24 may be used to provide database services, one server 24 may be used to render static content, one server 24 may be used to provide portlet services, one server 24 may be used to provide Java servlet services, and one server 24 may be used to provide IM services. In order to maintain high availability, each "server" 24 can be implemented using a cluster comprising a plurality of individual servers. Clustering makes the individual servers behave as a single server regardless of where the request is actually being completed. The ordered list 26 of servers is provided to each site 22A, 22B, 22C in the multi-site environment 20. In this example, server #3 24 in each site 22A, 22B, 22C is an IM server.

Each site 22A, 22B, 22C in the multi-site environment 20 includes a session routing portlet 28. The session routing portlet 28 includes a URL helper service 30. The URL helper service 30 includes a set of URL helper classes that are configured to generate a URL based on the ordered list 26 of servers 24 and associated information including the protocol, port, and path.

In step S2, in response to the receipt of an instant messaging (IM) session request 32A at one of the sites 22A, 22B, 22C in the multi-site environment 20 (site 22B in this example), the session routing portlet 28 at site 22B requests a URL from the URL helper service 30 and passes initialization parameters comprising the protocol, path, and port (these parameters are static—only the name of the server 24 changes). In general, all of the parameters could be different. In step S3, the URL helper service 30 builds and checks a URL by looping (step S4) through the ordered list 26 of servers 24, from highest priority to lowest, until a valid URL (i.e., a valid connection) is found. Once a valid URL is found, variables and their values may be appended to the URL string. In this example, it is assumed that the IM server (i.e., server #3 24 at the primary site 22A) is not up and that the first valid URL for an IM server is found at server 24 #3 at the secondary site 22B.

In step S5, the URL helper service 30 appends global variables to the valid URL found in step S4. The global variables comprise pieces of data which are passed to all of the places where URLs are built. Login information, which is always sent to the IM server, is an example of a global variable. This data is moved into the global variable section and maintained in one place. For example, given the following URL: http://servername/path:port?user=userID&special= special, global variables are used to fill in the common data, such as user ID, while specific variables are used for things which are specific to this instance of the connection.

In step S6, the URL helper service 30 appends runtime variables to the URL. For example, there may be two types of users involved in a chat: a user discussing a problem having a problem number (PMR) and a support representative (e.g., SME) of a company. To this extent, the PMR would be passed to the IM application as a runtime variable. This allows the support representative to look at the problem before beginning the chat with the user. In step S7, the generated URL is pushed to the user to redirect the IM session request 32A to the IM server (i.e., server 24 #3) at the secondary site 22B. This is indicated by arrow 34A in FIG. 3.

The above process is repeated for each corresponding IM session request, using the same ordered list 26 of servers 24, to ensure that all members of the IM session are directed to the same server 24 at the same site 22A, 22B, 22C in the multi-site environment 20. For example, a corresponding IM session request 32B received at site 22C would result in the generation of a URL redirecting the IM session request 32B to the first valid connection on the ordered list 26 of servers 24 (i.e., the IM server (server 24 #3) at the secondary site 22B). This is indicated by arrow 34B in FIG. 3. Thus, both IM session requests 32A, 32B are directed to the same server 24 in the multi-site environment 20.

In this implementation, the session routing portlet 28 is responsible for defining the protocol, servers, port, path, and variables and their values that are required to create a valid URL. These values are defined as initialization parameters in portlet.xml. The following code snippet is used to loop through the servers 24 in the ordered list 26 of servers 24 to determine a valid URL (NOTE: "servers" is an argument passed to the service):

```
// Loop through all of the possible servers, looking for a URL that
// is valid. Use the same protocol and the same path, since the
// only that should be different between the sites is the server name.
for (int i = 0; i < servers.size( ); i++) {
    // If this seems to be a valid and working URL, build the
    // base URL before appending the parameters to the end of it.
    if (URLHelper
        .isValidURL(request, protocol, (String) servers.get(i), path)) {
        url =
        URLHelper.buildURLWithoutParams(
        protocol,
        (String) servers.get(i),
        path);
```

```
        break;
      }
    }
  }
}
```

The URLHelper.isValidURL call can be as simple or as complicated as needed. A more complicated call may include evaluation of return codes or checking for specific strings. The following code snippet is used in the URLHelper.isValidURL method called above to attempt a connection using each server 24 defined in the ordered list 26 of servers 24:

```
// Check to see it the connect method throws an exception
URL testURL = new URL(protocol, host, port, path);
URLConnection connection = testURL.openConnection( );
connection.connect( );
```

Once a valid connection is found, the variables and their corresponding values are appended to the URL string. The URLHelper class defines global variables that may be set in the initialization parameters (portlet.xml) of the session routing portlet 28. If global variables have been configured to be included in the URL, their value will be pulled from portlet.xml and appended to the URL string. If there are additional runtime variables and values that need to be added to the URL string, a class may created to implement the RunTimeReplacement interface. This will allow a developer/administrator to define his/her own runtime variables. In an embodiment of the present invention, runtime parameters are pulled from portlet.xml in a similar manner to the global variables.

The solution provided by the present invention tests a URL for availability, and allows a developer/administrator to define the order in which to try connections. It also allows for flexibility by allowing the developer/administrator to define both global and runtime variables and values.

It should be noted that other types of front ends, other than a portal (session routing portlet 28), can be used to provide the session routing functionality of the present invention in response to a user request for an IM session. For example, the present invention can be implemented on a front end hosted on IIS, WAS, etc. In response to the request for an IM session, the user will be "routed" to a site using the criteria set forth herein.

It should also be noted that the present invention can be applied to resources other than IM. As an example, a multi-site environment may require a file storage system to store uploads to a SME. If the files which are being stored are too large to be transferred efficiently across a WAN to the different sites in real time, a user could be routed to the appropriate server to upload the requested file.

Figure 4:
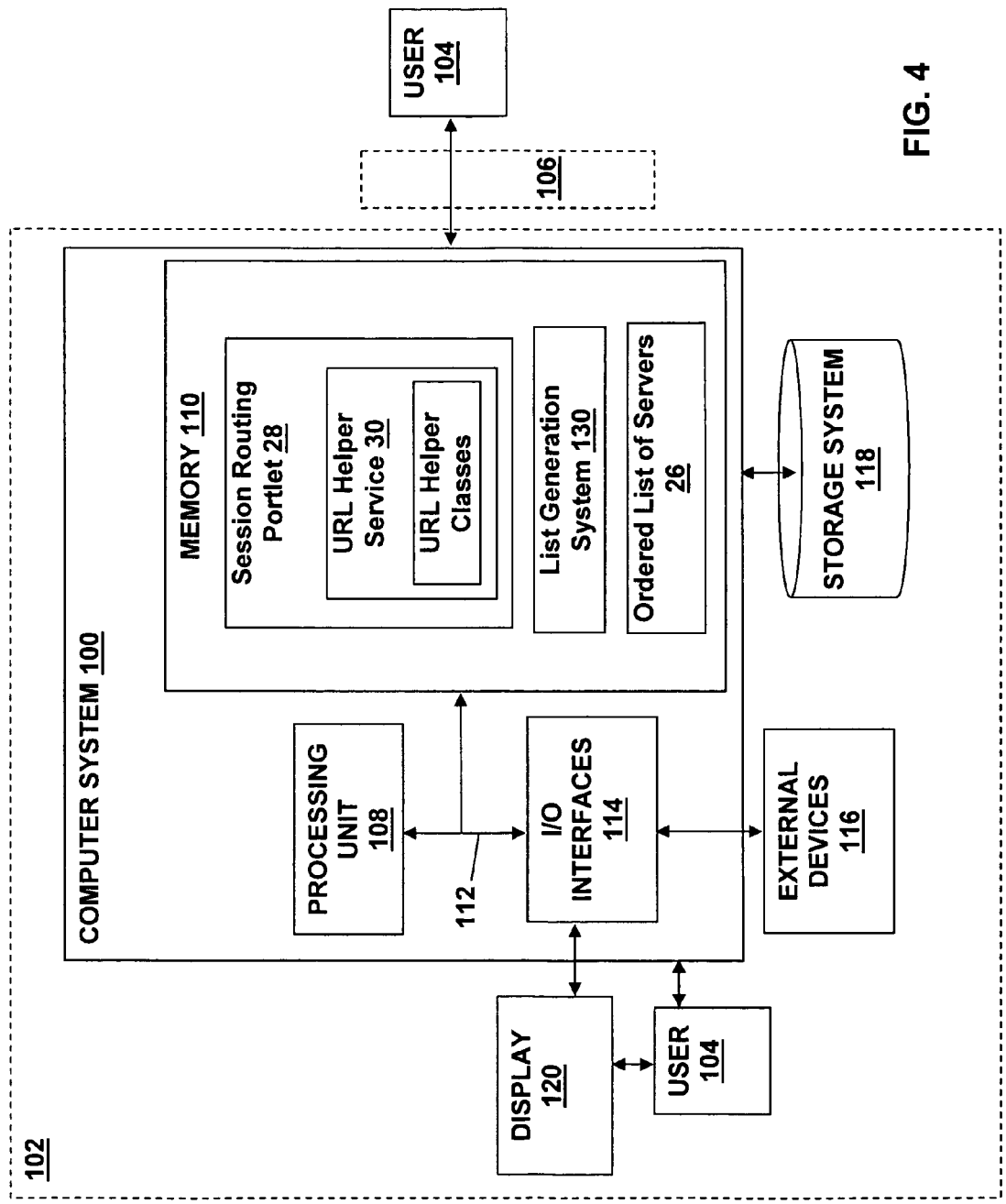
FIG. 4 depicts an illustrative computer system for implementing embodiment(s) of the present invention.

A computer system 100 for routing sessions to a specific URL in a multi-site environment in accordance with an embodiment of the present invention is depicted in FIG. 4. Computer system 100 is provided in a computer infrastructure 102. Computer system 100 is intended to represent any type of computer system capable of carrying out the teachings of the present invention. For example, computer system 100 can be a laptop computer, a desktop computer, a workstation, a handheld device, a server, a cluster of computers, etc. In addition, as will be further described below, computer system 100 can be deployed and/or operated by a service provider that offers a service for routing sessions to a specific URL in a multi-site environment in accordance with the present invention. It should be appreciated that a user 104 can access computer system 100 directly, or can operate a computer system that communicates with computer system 100 over a network 106 (e.g., the Internet, a wide area network (WAN), a local area network (LAN), a virtual private network (VPN), etc). In the case of the latter, communications between computer system 100 and a user-operated computer system can occur via any combination of various types of communications links. For example, the communication links can comprise addressable connections that can utilize any combination of wired and/or wireless transmission methods. Where communications occur via the Internet, connectivity can be provided by conventional TCP/IP sockets-based protocol, and an Internet service provider can be used to establish connectivity to the Internet.

Computer system 100 is shown including a processing unit 108, a memory 110, a bus 112, and input/output (I/O) interfaces 114. Further, computer system 100 is shown in communication with external devices/resources 116 and one or more storage systems 118. In general, processing unit 108 executes computer program code, such as session routing portlet 28, that is stored in memory 110 and/or storage system(s) 118. While executing computer program code, processing unit 108 can read and/or write data, to/from memory 110, storage system(s) 118, and/or I/O interfaces 114. Bus 112 provides a communication link between each of the components in computer system 100. External devices/resources 116 can comprise any devices (e.g., keyboard, pointing device, display (e.g., display 120, printer, etc.) that enable a user to interact with computer system 100 and/or any devices (e.g., network card, modem, etc.) that enable computer system 100 to communicate with one or more other computing devices.

Computer infrastructure 102 is only illustrative of various types of computer infrastructures that can be used to implement the present invention. For example, in one embodiment, computer infrastructure 102 can comprise two or more computing devices (e.g., a server cluster) that communicate over a network (e.g., network 106) to perform the various process steps of the invention. Moreover, computer system 100 is only representative of the many types of computer systems that can be used in the practice of the present invention, each of which can include numerous combinations of hardware/software. For example, processing unit 108 can comprise a single processing unit, or can be distributed across one or more processing units in one or more locations, e.g., on a client and server. Similarly, memory 110 and/or storage system(s) 118 can comprise any combination of various types of data storage media that reside at one or more physical locations. Further, I/O interfaces 114 can comprise any system for exchanging information with one or more external devices/resources 116. Still further, it is understood that one or more additional components (e.g., system software, communication systems, cache memory, etc.) not shown in FIG. 4 can be included in computer system 100. However, if computer system 100 comprises a handheld device or the like, it is understood that one or more external devices/resources 116 (e.g., a display) and/or one or more storage system(s) 118 can be contained within computer system 100, and not externally as shown.

Storage system(s) 118 can be any type of system (e.g., a database) capable of providing storage for information under the present invention. To this extent, storage system(s) 118 can include one or more storage devices, such as a magnetic disk drive or an optical disk drive. In another embodiment, storage system(s) 118 can include data distributed across, for example, a local area network (LAN), wide area network (WAN) or a storage area network (SAN) (not shown). Moreover, although not shown, computer systems operated by user 104 can contain computerized components similar to those described above with regard to computer system 100.

Shown in memory 110 (e.g., as a computer program product) is a session routing portlet 28 for routing sessions to a specific URL in a multi-site environment system in accordance with embodiments of the present invention. The session routing portlet 28 includes a URL helper service 30. The URL helper service 30 includes a set of URL helper classes that are configured to generate a URL based on an ordered list 26 of servers and associated information including the protocol, port, and path. The ordered list 26 of servers can be stored in storage unit 118. A list generation system 130 can be provided to generate the ordered list 26 of servers. Using the ordered list 26 of servers, the URL helper service 30 determines a valid URL by looping through the list until a successful connection can be found.

The present invention can be offered as a business method on a subscription or fee basis. For example, one or more components of the present invention can be created, maintained, supported, and/or deployed by a service provider that offers the functions described herein for customers. That is, a service provider can be used to provide a service for routing sessions to a specific URL in a multi-site environment instant messaging system, as described above.

It should also be understood that the present invention can be realized in hardware, software, or any combination thereof. Any kind of computer/server system(s)—or other apparatus adapted for carrying out the methods described herein—is suitable. A typical combination of hardware and software can include a general purpose computer system with a computer program that, when loaded and executed, carries out the respective methods described herein. Alternatively, a specific use computer, containing specialized hardware for carrying out one or more of the functional tasks of the invention, can be utilized. The present invention can also be embedded in a computer program product, which comprises all the respective features enabling the implementation of the methods described herein, and which—when loaded in a computer system—is able to carry out these methods.

The invention can take the form of an entirely hardware embodiment, an entirely software embodiment, or an embodiment containing both hardware and software elements. In a preferred embodiment, the invention is implemented in software, which includes but is not limited to firmware, resident software, microcode, etc.

The present invention can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, or transport the program for use by or in connection with the instruction execution system, apparatus, or device.

The medium can be an electronic, magnetic, optical, or semiconductor system (or apparatus or device). Examples of a computer-readable medium include a semiconductor or solid state memory, magnetic tape, removable computer diskette, random access memory (RAM), read-only memory (ROM), rigid magnetic disk and optical disk. Current examples of optical disks include a compact disk-read only disk (CD-ROM), a compact disk-read/write disk (CD-R/W), and a digital versatile disk (DVD).

Computer program, software program, program, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

The foregoing description of the preferred embodiments of this invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of this invention as defined by the accompanying claims.

What is claimed is:

1. A method for routing sessions to a specific Uniform Resource Locator (URL) in a multi-site environment, the multi-site environment comprising a plurality of sites, each site comprising a plurality of servers, comprising:
   prioritizing each of the plurality of sites;
   providing an ordered list of servers in the multi-site environment, wherein the same ordered list of servers is provided to each of the plurality of sites, wherein each server at each site is assigned a different task from a group of tasks common to each site, and wherein the servers on the ordered list of servers are ordered based on the priorities of the sites and the different tasks assigned to the servers at each site;
   receiving a first session request submitted by a user at a first site of the plurality of sites;
   requesting, in response to receiving the first session request, a valid URL from a URL helper service of the first site and passing initialization parameters comprising a protocol, a path, and a port;
   looping, using the URL helper service of the first site, through the ordered list of servers from highest priority to lowest priority at the site that received the first session request until a valid URL is found;
   appending global variables and runtime variables to the valid URL, wherein global variables includes at least login information;
   redirecting the first session request to the server at the site in the multi-site environment specified by the valid URL;
   receiving a second session request submitted by another user at a second, different site of the plurality of sites;
   requesting, in response to receiving the second session request, a valid URL from a URL helper service of the second, different site and passing initialization parameters comprising a protocol, a path, and a port;
   looping, using the URL helper service of the second, different site, through the ordered list of servers at the site that received the second session request until a valid URL is found; and
   redirecting the second session request to the server in the multi-site environment specified by the valid URL, wherein the first and second session requests are directed to the same server at the same site in the multi-site environment based on the same ordered list of servers.

2. The method of claim 1, wherein the first and second session requests comprise instant messaging session requests.

3. The method of claim 1, wherein the plurality of sites are prioritized based on a physical location of each of the sites.

4. The method of claim 1, wherein each site in the multi-site environment is substantially identical to, and independent of, other sites in the multi-site environment.

5. The method of claim 1, further comprising:
pushing the valid URL to a user that submitted the second session request to redirect the second session request to the server at the site in the multi-site environment specified by the valid URL.

6. A system for routing sessions to a specific Uniform Resource Locator (URL) in a multi-site environment, the multi-site environment comprising a plurality of sites, each site comprising a plurality of servers, comprising:
at least one computer, comprising:
a system for prioritizing each of the plurality of sites;
a system for providing an ordered list of servers in the multi-site environment, wherein the same ordered list of servers is provided to each of the plurality of sites, wherein each server at each site is assigned a different task from a group of tasks common to each site, and wherein the servers on the ordered list of servers are ordered based on the priorities of the sites and the different tasks assigned to the servers at each site;
a system for receiving a first session request submitted by a user at a first site of the plurality of sites;
a system for requesting, in response to receiving the first session request, a valid URL from a URL helper service of the first site and passing initialization parameters comprising a protocol, a path, and a port;
a system for looping, using the URL helper service of the first site, through the ordered list of servers from highest priority to lowest priority at the site that received the first session request until a valid URL is found;
a system for appending global variables and runtime variables to the valid URL, wherein global variables includes at least login information;
a system for redirecting the first session request to the server at the site in the multi-site environment specified by the valid URL;
a system for receiving a second session request submitted by another user at a second, different site of the plurality of sites;
a system for requesting, in response to receiving the second session request, a valid URL from a URL helper service of the second, different site and passing initialization parameters comprising a protocol, a path, and a port;
a system for looping, using the URL helper service of the second, different site, through the ordered list of servers at the site that received the second session request until a valid URL is found; and
a system for redirecting the second session request to the server in the multi-site environment specified by the valid URL, wherein the first and second session requests are directed to the same server at the same site in the multi-site environment based on the same ordered list of servers.

7. The system of claim 6, wherein the first and second session requests comprise instant messaging session requests.

8. The system of claim 6, wherein the plurality of sites are prioritized based on a physical location of each of the sites.

9. The system of claim 6, wherein each site in the multi-site environment is substantially identical to, and independent of, other sites in the multi-site environment.

10. The system of claim 6, further comprising:
a system for pushing the valid URL to a user that submitted the second session request to redirect the second session request to the server at the site in the multi-site environment specified by the valid URL.

11. A program product stored on a non-transitory computer readable storage medium for routing sessions to a specific Uniform Resource Locator (URL) in a multi-site environment, the multi-site environment comprising a plurality of sites, each site comprising a plurality of servers, the computer readable medium comprising program code for:
prioritizing each of the plurality of sites;
providing an ordered list of servers in the multi-site environment, wherein the same ordered list of servers is provided to each of the plurality of sites, wherein each server at each site is assigned a different task from a group of tasks common to each site, and wherein the servers on the ordered list of servers are ordered based on the priorities of the sites and the different tasks assigned to the servers at each site;
receiving a first session request submitted by a user at any of the plurality of sites;
requesting, in response to receiving the first session request, a valid URL from a URL helper service of the first site and passing initialization parameters comprising a protocol, a path, and a port;
looping, using the URL helper service of the first site, through the ordered list of servers from highest priority to lowest priority at the site that received the first session request until a valid URL is found;
appending global variables and runtime variables to the valid URL, wherein global variables includes at least login information;
redirecting the first session request to the server at the site in the multi-site environment specified by the valid URL;
receiving a second session request submitted by another user at a second, different site of the plurality of sites;
requesting, in response to receiving the second session request, a valid URL from a URL helper service of the second, different site and passing initialization parameters comprising a protocol, a path, and a port;
looping, using the URL helper service of the second, different site, through the ordered list of servers at the site that received the second session request until a valid URL is found; and
redirecting the second session request to the server in the multi-site environment specified by the valid URL, wherein the first and second session requests are directed to the same server at the same site in the multi-site environment based on the same ordered list of servers.

12. A method for deploying an application for routing sessions to a specific Uniform Resource Locator (URL) in a multi-site environment, the multi-site environment comprising a plurality of sites, each site comprising a plurality of servers, comprising:
providing a computer infrastructure being operable to:
prioritize each of the plurality of sites;
provide an ordered list of servers in the multi-site environment, wherein the same ordered list of servers is provided to each of the plurality of sites, wherein each server at each site is assigned a different task from a group of tasks common to each site, and wherein the servers on the ordered list of servers are ordered based on the priorities of the sites and the different tasks assigned to the servers at each site;
receive a first session request submitted by a user at any of the plurality of sites;
request, in response to receiving the first session request, a valid URL from a URL helper service of the first site and passing initialization parameters comprising a protocol, a path, and a port;

loop, using the URL helper service of the first site, through the ordered list of servers from highest priority to lowest priority at the site that received the session request until a valid URL is found;

append global variables and runtime variables to the valid URL, wherein global variables includes at least login information;

redirect the session request to the server at the site in the multi-site environment specified by the valid URL;

receive a second session request submitted by another user at a second, different site of the plurality of sites;

request, in response to receiving the second session request, a valid URL from a URL helper service of the second, different site and passing initialization parameters comprising a protocol, a path, and a port;

loop, using the URL helper service of the second, different site, through the ordered list of servers at the site that received the second session request until a valid URL is found; and redirect the second session request to the server in the multi-site environment specified by the valid URL, wherein the first and second session requests are directed to the same server at the same site in the multi-site environment based on the same ordered list of servers.

13. The program product of claim 11, wherein the first and second session requests comprise instant messaging session requests.

14. The program product of claim 11, wherein the plurality of sites are prioritized based on a physical location of each of the sites.

15. The program product of claim 11, wherein each site in the multi-site environment is substantially identical to, and independent of, other sites in the multi-site environment.

16. The program product of claim 11, further comprising program code for: pushing the valid URL to a user that submitted the second session request to redirect the second session request to the server at the site in the multi-site environment specified by the valid URL.

17. The method of claim 12, wherein the first and second session requests comprise instant messaging session requests.

18. The method of claim 12, wherein the plurality of sites are prioritized based on a physical location of each of the sites.

19. The method of claim 12, wherein each site in the multi-site environment is substantially identical to, and independent of, other sites in the multi-site environment.

20. The method of claim 12, further comprising: pushing the valid URL to a user that submitted the second session request to redirect the second session request to the server at the site in the multi-site environment specified by the valid URL.

* * * * *